Figure 1:
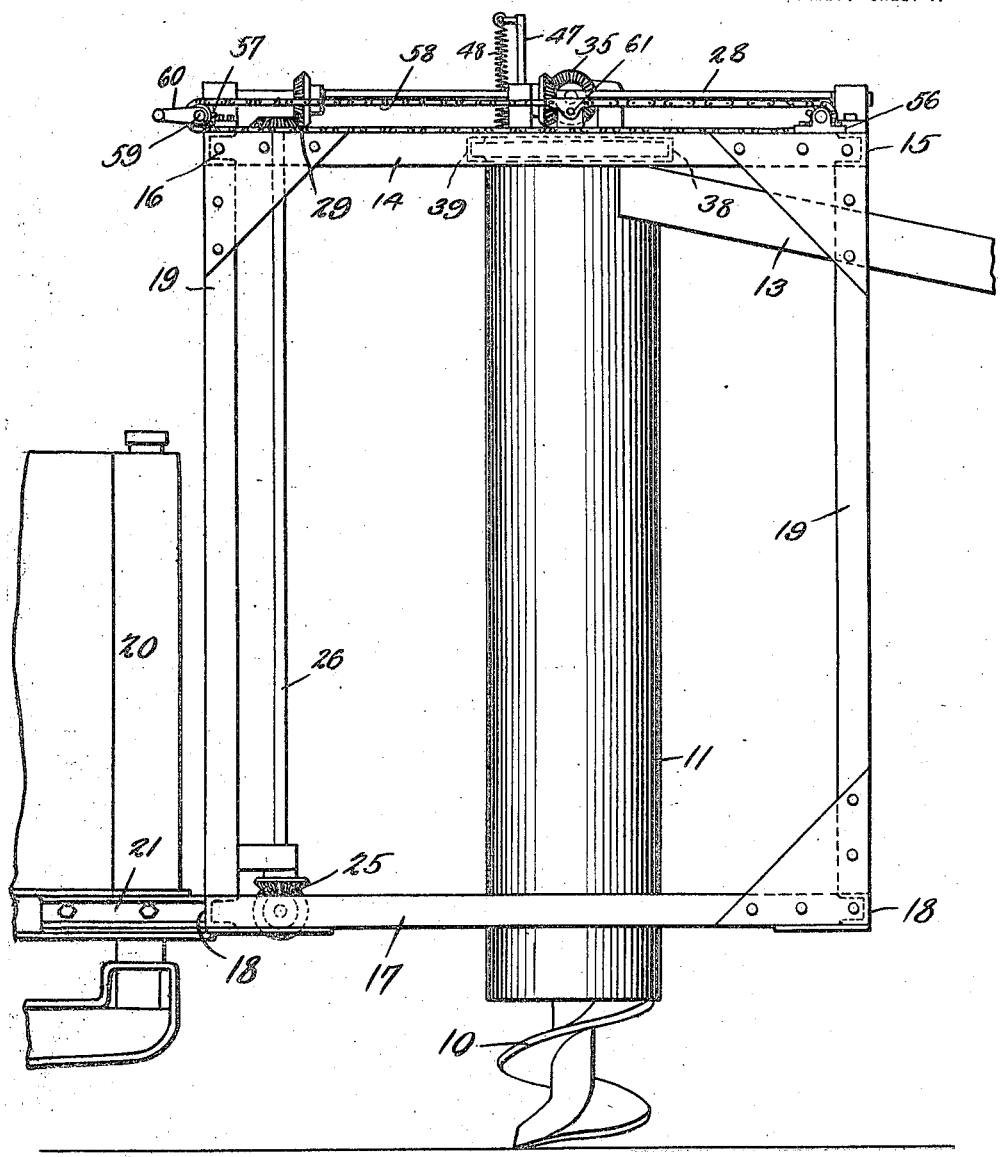

R. J. NEWCOMB.
MANURE LOADER.
APPLICATION FILED APR. 19, 1921.

1,423,676.

Patented July 25, 1922.
4 SHEETS—SHEET 1.

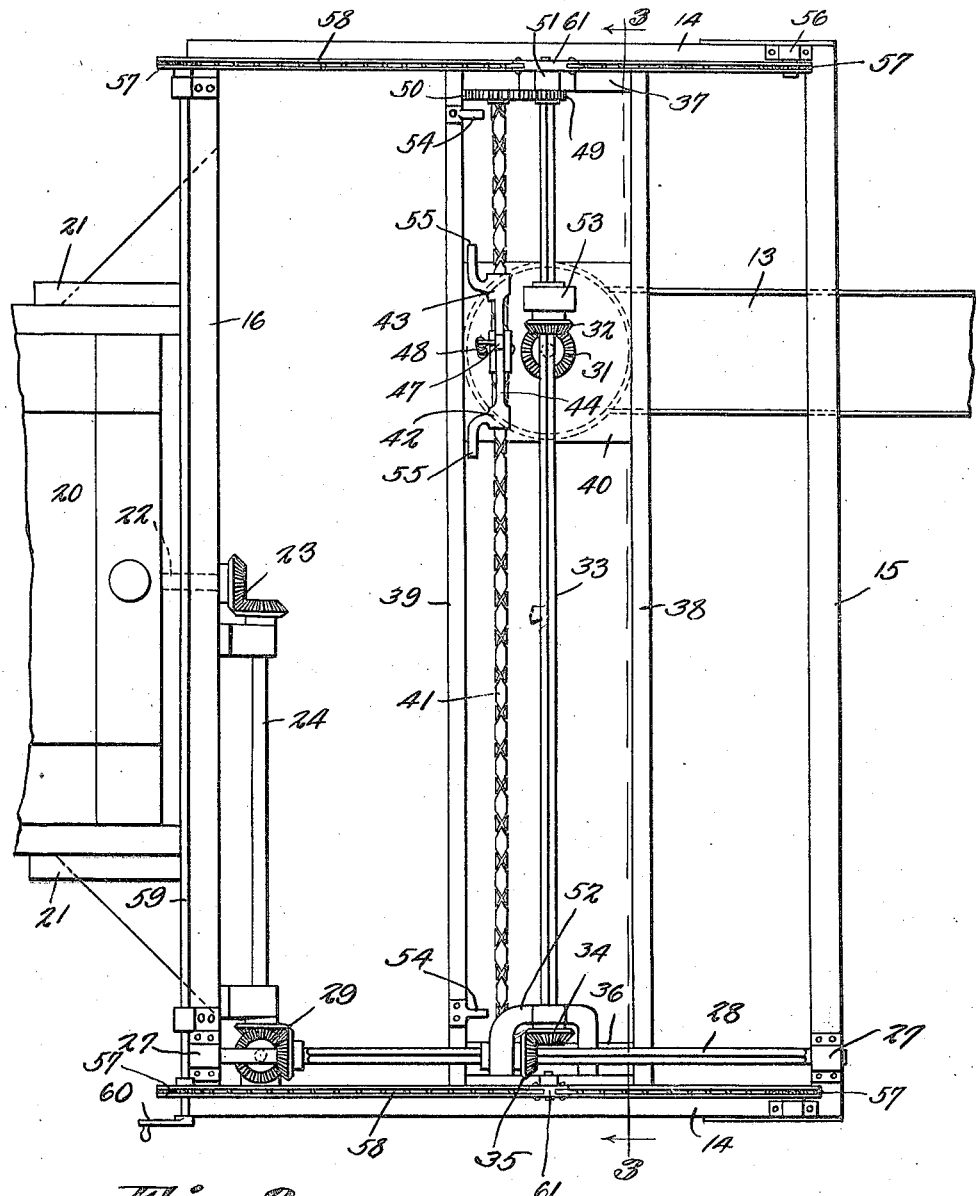

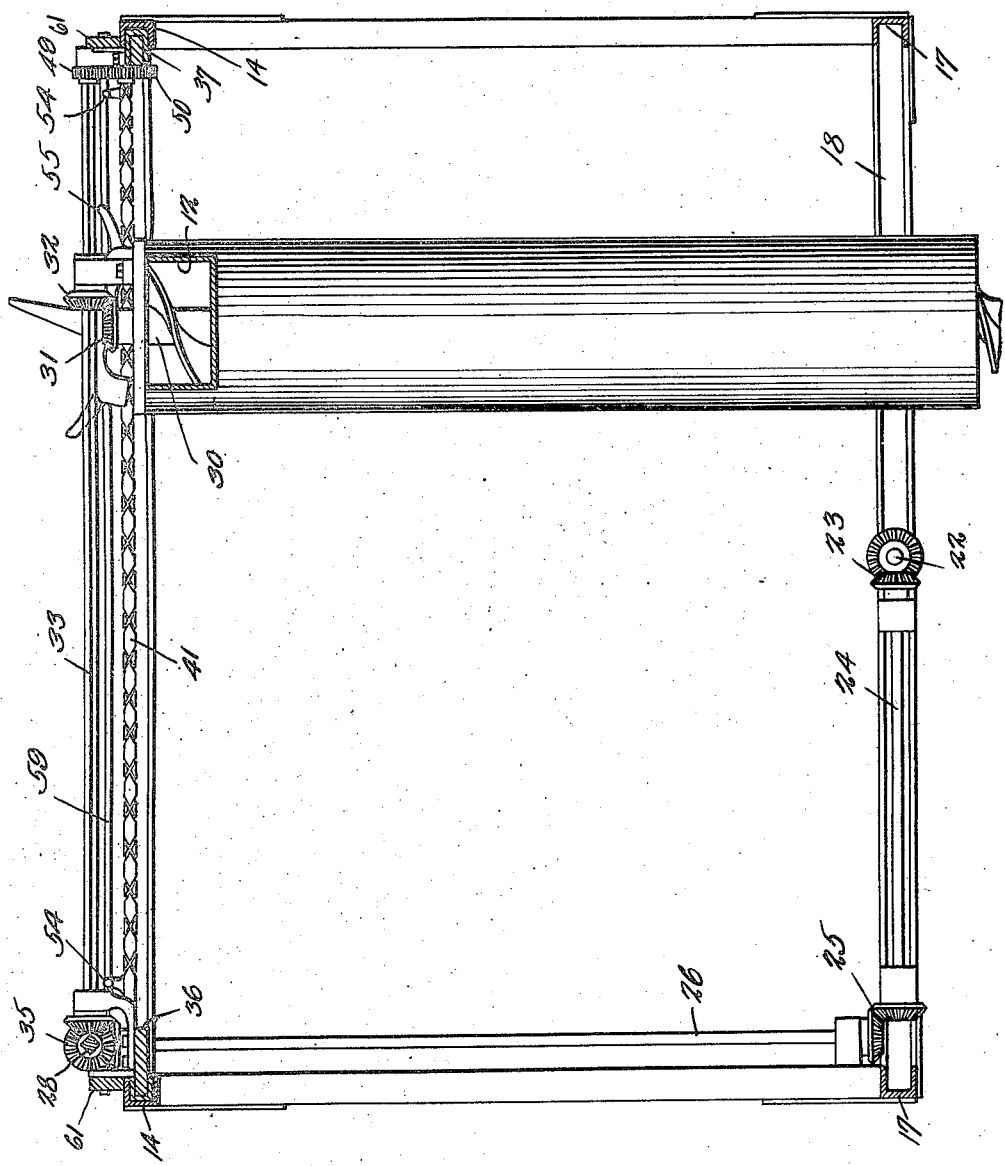

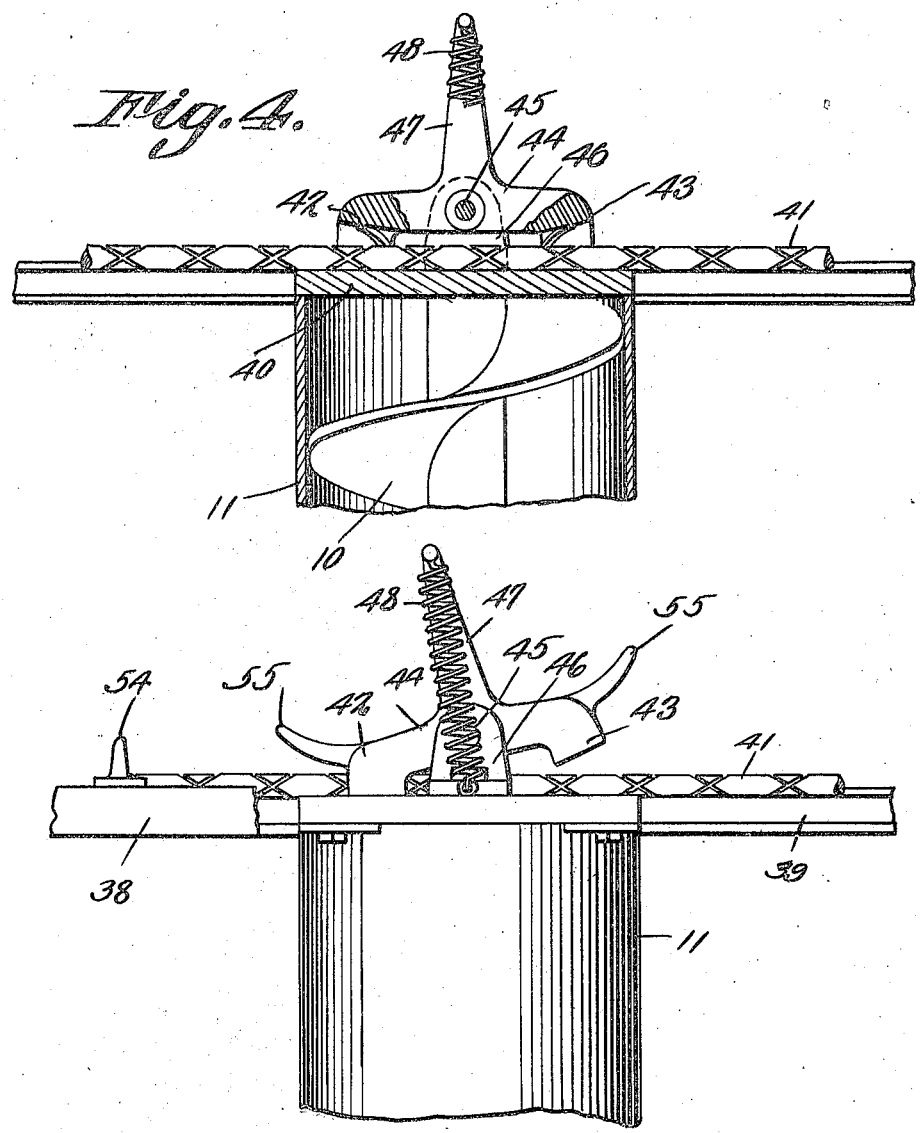

UNITED STATES PATENT OFFICE.

ROMIE J. NEWCOMB, OF BALTIMORE, MARYLAND.

MANURE LOADER.

1,423,676. Specification of Letters Patent. Patented July 25, 1922.

Application filed April 19, 1921. Serial No. 462,630.

*To all whom it may concern:*

Be it known that I, ROMIE J. NEWCOMB, a citizen of the United States, residing at Baltimore city, State of Maryland, have invented certain new and useful Improvements in Manure Loaders, of which the following is a specification.

This invention relates to apparatus for picking up material and discharging the same into a wagon or other receiver.

The apparatus which is the subject matter of the present application for patent has been designed more particularly for picking up manure from a pile and loading the same on a manure spreader, wagon or other conveyance, but it is to be understood that the apparatus is not limited to any particular kind of material to be transferred from one place to another.

The invention has for its object to provide an apparatus of the kind stated in which the material-conveying means are movable to effect an even distribution of the material in the wagon body or other part to be loaded.

The object stated is attained by means of a novel combination and arrangement of parts to be hereinafter described and claimed, and in order that the same may be better understood, reference is had to the accompanying drawing forming a part of this specification.

In the drawings,

Fig. 1 is a side elevation of the apparatus; Fig. 2 is a plan view thereof; Fig. 3 is a cross-section on the line 3—3 of Fig. 2 and Figs. 4 and 5 are enlarged detail views of a feed screw and certain parts cooperating therewith, Fig. 4 being partly in section.

Referring specifically to the drawings, the apparatus consists of a material gathering and conveying means constructed and arranged to gather or pick up the material and to deliver the same into a wagon box or other receptacle. This mechanism is movable in such a way that the material is carried to all parts of the receptacle and thus evenly distributed therein.

The gathering and conveying device is a vertically positioned auger or screw 10 working in a cylindrical housing 11, which latter terminates at the bottom short of the lower end of the screw so as to leave the same protruding and exposed as shown in Fig. 1, it being understood that the lower protruding end of the screw is designed to be carried into contact with the material to pick up the same, and which is then carried upwardly by the screw through the housing to a top side outlet 12 therein from which a chute 13 extends sidewise. This chute ends out far enough to deliver the material into the wagon box or other receptacle, the chute being inclined so that the material slides down the same and is discharged by gravity.

The supporting frame of the apparatus is rectangular and it is composed of top side bars 14 connected by front and rear cross bars 15 and 16, bottom side bars 17 connected by front and rear cross bars 18, and upright bars 19 connecting said top and bottom bars at the corners of the frame.

The screw conveyer 10 and other parts to be presently described, are power-driven. A convenient power source may be a tractor, a fragment of which latter is shown at 20 in Figs. 1 and 2. It will be understood, of course that any other power source may be provided. The supporting frame hereinbefore described is rigidly connected at its rear end to the front end of the tractor, by means of suitable coupling members 21.

At 22 is shown a horizontal shaft which is suitably coupled to the driving means of the tractor 20. This shaft extends forwardly from the tractor and is connected by a bevel gearing 23 to a horizontal shaft 24 extending transversely of the supporting frame of the conveying mechanism. The shaft 24 is connected by a bevel gearing 25 to the lower end of a vertical shaft 26. The supporting frame carries suitable bearings for supporting the shafts 24 and 26.

At one end of the supporting frame, the top cross bars 15 and 16 carry bearings 27 which support a horizontal shaft 28 running in the direction of the length of the frame. The shaft 28 is driven by the shaft 26 through a bevel gearing 29.

On the upper end of the shaft 30 of the conveyer screw 10 is a bevel gear 31 which is in mesh with a bevel gear 32 on a transverse shaft 33, said shaft obtaining motion from the shaft 28 through bevel gears 34 and 35.

It will be evident from the foregoing that the conveyer screw 10 is power driven, the motion of the drive shaft 22 being transmitted to the screw shaft 30 through the various operatively connected shafts described.

The conveyer screw 10 and its housing 11 are movable bodily back and forth in a direction transversely of the supporting frame of the apparaus, and also longitudinally, in order that the material may be evenly distributed in the wagon box or other receptacle, the discharge chute 13 being carried back and forth in the direction of the length of the wagon box, and it being also possible to shift the chute in a direction transverse of the wagon box after each longitudinal stroke. The lower end of the screw 10 which picks up the material has a corresponding movement, and hence it is carried to all parts of the pile of material to be transferred to the wagon box or other receptacle.

The movement of the conveyer screw 10 and its housing 11 transversely and longitudinally of the supporting frame of the apparatus for the purpose hereinbefore described, is obtained by the following means:

The top side bars 14 are channeled as shown in Fig. 3, and in the channels of said bars are slidably mounted the supporting members 36 and 37 of a pair of rails 38 and 39, said rails being spaced in the direction of the length of the supporting frame of the apparatus and extending transversely thereof. The rails 38 and 39 are channel bars having their channels facing each other, and extending between said rails, and slidably seating in the channels thereof, is a support 40 for the housing 11 and the screw 10. This support may be a flat plate or similar member to the under side of which the housing 11 is bolted or otherwise rigidly secured. The screw shaft 30 passes through the support 40 and the pinion 31 is above the latter.

Extending transversely of the supporting frame of the apparatus, is a feed screw 41 having two threads which are reversely arranged, and on the support 40 are nuts 42 and 43 which are alternately engageable with the feed screw. One of the nuts is designed to engage one thread of the feed screw, and the other nut is designed to engage the other thread of the feed screw, and as the threads are reversely arranged, it will be evident that when one of the nuts engages the feed screw the support 40 travels in one direction, whereas when the other nut engages the feed screw said support is made to travel in the opposite direction. The nuts are automatically engaged and disengaged alternately when the support 40 reaches the end bars 14, by the following means:

The nuts 42 and 43 are at the respective ends of a rocker 44 which is pivoted midway between its ends, as shown at 45, to a bracket 46 carried by the support 40. Midway between its ends, the rocker 44 has an upstanding arm 47 to the outer end of which is connected one end of a spring 48 having its other end anchored to the bracket 46. The rocker 44 overhangs the feed screw 41, and upon tilting the rocker to lower one end thereof, the nut on that end operatively engages the feed screw, whereas when the rocker is tilted to lower its other end, the nut on this end is brought into operative engagement with the feed screw. When the rocker is horizontal, as shown in Fig. 4, both nuts are clear of the feed screw, and the spring 48 holds the rocker in this position as the arm 47 is now erect and the axis of the spring intersects the pivotal axis of the rocker. However, when the rocker tilts to either side the arm 47 draws the spring over to the same side of the rocker axis so that the spring now exerts its tension to hold the rocker tilted. Fig. 5 shows the rocker tilted to engage the nut 42 with the feed screw, and this view when considered in connection with Fig. 4 also illustrates the action of the spring as hereinbefore described.

The feed screw 41 obtains motion from the shaft 33, there being a pinion 49 on said shaft meshing with the pinion 50 on the feed screw. The shaft 33 is supported at one end in a bearing 51 on the supporting member 37 of the rails 38 and 39, and on the supporting member 36 is a bearing 52 for the other end of the shaft. The support 40 also has a bearing 53 for the hub of the gear 32. Inasmuch as the support 40 is slidable in the direction of the length of the shaft 33, the latter is made angular in cross-section and the hub bore of the gear 32 is correspondingly shaped. The gear 32 therefore slides on the shaft 33, in order that it may remain in mesh with the gear 31 of the screw shaft 30.

In operation, the engagement of the nut 42 with the feed screw 41 moves the support 40 and the parts carried thereby in one direction, whereas the engagement of the nut 43 with the feed screw moves said parts in the opposite direction, due to the reverse arrangement of the threads of the feed screw. In order that the travel of the support 40 may be automatically reversed at the end of its travel in either direction, the rail 39 is fitted with abutments 54, and the nuts 42 and 43 have projecting trip fingers 55. The nut 42 feeds the support 40 to the left in Fig. 2, and when said support reaches the limit of its travel in this direction, the finger 55 of the nut 42 strikes the abutment 54 on this side of the apparatus, whereupon the rocker 44 is tripped to disengage the nut 42 from the feed screw and to engage the nut 43 therewith. The support 40 now travels to the right, and at the end of its travel in this direction the motion is reversed by the finger 55 of the nut 43 striking the abutment 54 at this side of the frame, thereby tripping the rocker to disengage the nut 43 from the feed screw and to engage the nut 42 therewith, so that the support 40 now again travels to the left. This movement back and forth of the support 40 carries the chute 13 back and forth in the direction of the length of the wagon box or other receptacle to be loaded, to evenly distribute the material. The screw 10 also travels back and forth along the pile of material to be loaded in the wagon box, and hence all portions of the pile are reached by the screw.

The movement of the screw 10 and the chute 13 at a right angle to the hereinbefore described movement, or in a direction lengthwise of the apparatus is obtained by the following means:

On the front and rear ends of the top side bars 14 are supports 56 for the shafts of sprocket wheels 57. The front and rear sprocket wheels are connected by chains 58 which are connected to the supports 36 and 37 of the rails 38 and 39. It will therefore be seen that the supports are moved in the direction of the front or the rear ends of the apparatus, parallel to the side bars 14, when the chains 58 are set in motion. The rear sprocket wheels 57 are on a transverse shaft 59 provided with a crank handle 60 for manual operation. Any suitable means 61 may be provided for coupling the supports to the chains 58.

In order that the gears 34 and 35 may remain in mesh, the latter is slidable on the shaft 28 and said shaft is of square or other angular cross-section. The bearing member 52 carried by the support 36 is constructed to support the hubs of the gears 34 and 35.

The apparatus is efficient and reliable in operation, and it effectually serves the purpose for which it has been designed. The preferred embodiment of the invention has been disclosed, but it will be understood that many changes and modification may be made without a departure from the spirit and scope of the invention as claimed hereinafter.

I claim:

1. An apparatus for gathering and conveying material, comprising a supporting frame, movable gathering and conveying elements connected to travel together, a support for said elements, rails slidably supporting said support and arranged transversely of the supporting frame, supporting means for the rails carried by the supporting frame and movable in the direction of the length thereof, operating means for the supporting means, a feed screw carried by the supporting means and having reversely arranged threads, feed nuts carried by the aforesaid support and alternately engageable with the respective threads of the feed screw, operating means for the feed-screw, and means for operating the gathering and conveying elements.

2. An apparatus for gathering and conveying material, comprising a supporting frame, movable gathering and conveying elements connected to travel together, a support for said elements, rails slidably supporting said support and arranged transversely of the supporting frame, supporting means for the rails carried by the supporting frame and movable in the direction of the length thereof, operating means for the supporting means, a feed screw carried by the supporting means and having reversely arranged threads, feed nuts engageable with the respective threads of the feed screw, a tiltable carrier for the feed nuts carried by the aforesaid support for alternately placing the same into operative relation with the feed screw, abutments in the path of said carrier for actuating the same, operating means for the feed screw, and means for operating the gathering and conveying elements.

3. An apparatus for gathering and conveying material, comprising a supporting frame, movable gathering and conveying elements connected to travel together, a support for said elements, rails slidably supporting said support and arranged transversely of the supporting frame, supporting means for the rails carried by the supporting frame and movable in the direction of the length thereof, operating means for the supporting means, a feed screw carried by the supporting means and having reversely arranged threads, feed nuts engageable with the respective threads of the feed screw, a rocker supporting the feed nuts at its respective ends, a pivotal support for the rocker on the aforesaid support, means for automatically operating the rocker to alternately engage the nuts with the feed screw, operating means for the feed screw, and means for operating the gathering and conveying elements.

4. An apparatus for gathering and conveying material, comprising a supporting frame, movable gathering and conveying elements connected to travel together, a support for said elements, rails slidably supporting said support and arranged transversely of the supporting frame, supporting means for the rails carried by the supporting frame and movable in the direction of the length thereof, operating means for the supporting means, a feed screw carried by supporting means and having reversely arranged threads, feed nuts engageable with the respective threads of the feed screw, a rocker pivotally supported by the aforesaid support and carrying the feed nuts at its respective ends, an arm extending from the rocker, a spring connected to said arm and swinging transversely of the pivotal axis of the rocker when the latter tilts, means for automatically tilting the rocker to alternately engage the nuts with the feed screw, operating means for the feed screw, and operating means for the gathering and conveying elements.

5. An apparatus for gathering and conveying material, comprising a supporting frame, movable gathering and conveying elements connected to travel together, a support for said elements, rails slidably supporting said support and arranged transversely of the supporting frame, supporting means for the rails carried by the supporting frame and movable in the direction of the length thereof, operating means for the supporting means, a feed screw carried by the supporting means and having reversely arranged threads, feed nuts engageable with the respective threads of the feed screw, a rocker supporting the feed nuts at its respective ends and pivotally supported by the aforesaid support, abutments in the path of the rocker for tilting the same to alternately engage the nuts with the feed screw, operating means for the feed screw, and means for operating the gathering and conveying elements.

6. An apparatus for gathering and conveying material, comprising a supporting frame, a screw-conveyer, a housing having an inlet and an outlet, said housing enclosing the screw-conveyer and the latter projecting from the inlet end thereof, a support for the housing, rails slidably supporting said support and arranged transversely of the supporting frame, supporting means for the rails carried by the supporting frame and movable in the direction of the length thereof, operating means for the supporting means, a feed screw carried by the supporting means and having reversely arranged threads, feed nuts carried by the aforesaid support and engageable with the respective threads of the feed screw, a shaft carried by the aforesaid supporting means, gearing between said shaft and the screw conveyer, the gear member on said shaft being slidable thereon, gearing between the shaft and the feed screw, a shaft extending transversely of the aforesaid shaft at one end thereof and supported by the aforesaid supporting frame, gearing between the shafts, the gear member on the second-mentioned shaft being slidable thereon, and driving means for the second-mentioned shaft.

In testimony whereof I affix my signature.

ROMIE J. NEWCOMB.